United States Patent [19]
Petre

[11] 3,820,864
[45] June 28, 1974

[54] CAGE FOR A ROLLING BEARING AND METHOD OF MAKING IT

[75] Inventor: James Gusten Ragnar Petre, Onsala, Sweden

[73] Assignee: SKF Industrial Trading and Development Company, B.V., Amsterdam, Netherlands

[22] Filed: Apr. 9, 1973

[21] Appl. No.: 349,249

[30] Foreign Application Priority Data
Apr. 18, 1973 Sweden.............................. 734687

[52] U.S. Cl. .............................................. 308/201
[51] Int. Cl. ........................................... F16c 19/20
[58] Field of Search............................ 308/217, 201

[56] References Cited
FOREIGN PATENTS OR APPLICATIONS
1,183,894  3/1959  France.................................. 308/7

Primary Examiner—Charles J. Myhre
Assistant Examiner—Frank Susko
Attorney, Agent, or Firm—Howson and Howson

[57] ABSTRACT

A rolling bearing assembly includes a plurality of rolling elements and a cage for said elements. The portions of the cage which do not contact the elements are covered with a fibre flock.

4 Claims, 1 Drawing Figure

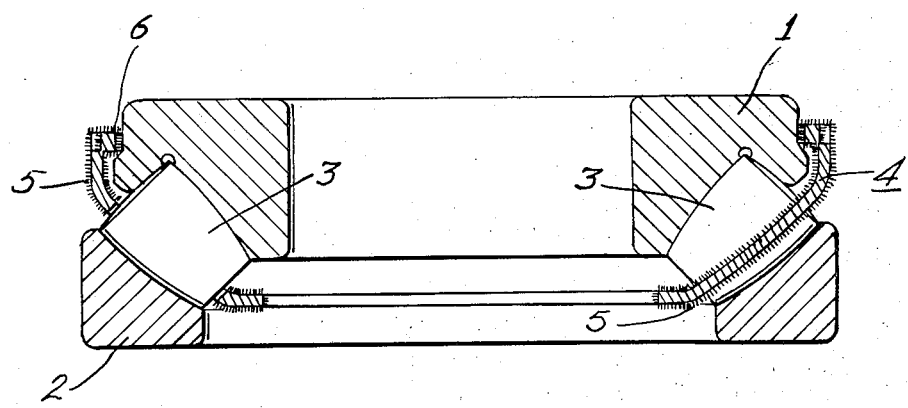

CAGE FOR A ROLLING BEARING AND METHOD OF MAKING IT

The present invention relates to a cage for a rolling bearing and a method of making it.

An important factor for the estimated life length of a rolling bearing is that it is properly lubricated. It is also important that the bearing makes the least possible noise.

It is previously known to fill the space between the bearing rece rings and the rolling bodies with grease and to provide the rings or the cage with different types of seals which prevent penetration of dirt and escape of lubricant. The grease has, however, a tendency to be thrown by the centrifugal force to positions where it has no lubricating effect.

To decrease the bearing noise it is previously known to cover the bearing with a sound absorbing material. Tests have also been carried out to make cages of synthetic resin material for this purpose. Special bearing applications, however, mean increased costs, and cages of synthetic resin do not always have a sufficient strength.

With the present invention, the lubricating problem is solved in a simple way, and in addition an extremely silent bearing is achieved. The invention is mainly characterized by the fact that the cage is completely or partly covered by a fibre flock on those parts of the cage which do not contact the rolling bodies.

The invention will now be closer described in connection to the accompanying drawing, which shows a section of an axial roller bearing provided with a cage according to the invention. The bearing comprises an inner and an outer race ring 1 and 2 respectively. Between these rings, a number of rolling bodies 3 are provided. The rolling bodies 3 are guided by a cage 4. The cage is covered with a flock of fibres 5 in a manner known per se, e.g., by an electrostatic method. The fibres are suitably made of a synthetic resin material, such as polyamide. The method is in principle carried out in the following way: the cage is covered by an adhesive material and is placed in an electrostatic field, whereafter it is sprinkled with fibres of a suitable length, which fibres are oriented in a direction perpendicular to the surface of the cage when contacting the cage. Depending on the type of cage and bearing and other factors, fibres with different sizes may be used for covering the cages. It is preferred that a kind of fibres is used which constitutes a compact and rather rough "carpet" on the cage.

It is important that the fibres are not placed so that they can be squeezed between two surfaces which move in relation to each other. For this reason, the cage pockets, which contact the rolling bodies, should not be covered with fibre flock. Therefore, the cage should preferably be covered with fibre flock before the pockets are made, e.g., by stamping. Thereby the fibre flock is automatically removed from the parts of the cage which should not be covered with flock when the pockets are produced.

A test bearing provided with a cage according to the invention was about 5 dB less noisy than a similar bearing which was provided with a cage without a fibre flock layer. It has also been shown that bearings provided with cages according to the invention which have been dipped in oil will have a satisfactory lubrication under certain circumstances. In a test, a flange roller bearing with a conventional cage was run with axial load, whereby bearing failure occurred after about 15 minutes if the lubricant consisted only of oil which had adhered to the cage when this was dipped in an oil bath. In a similar test with a bearing provided with a cage covered with a fibre flock which had been dipped in oil, the bearing ran for 72 hours without failure, whereafter the test was interrupted.

The fibre flock can also have a sealing function if the cage is disigned so that its end parts are close to the inner and the outer race ring of the bearing. The free ends of the fibres which cover said end parts are thereby contacting the respective rings, whereby a sealed space is provided between the outer and the inner ring. Such a seal is very effective since it acts like a brush against the rings, whereby the dirt which has been collected in the fibre flock is thrown out from the bearing by the centrifugal force. It can be seen in the figure that one side 6 of the cage is positioned very close to the inner ring 1, and it is of course also possible to design the cage so that it also comes close to the ring 1 at the other side, and to provide it with flanges or the like so that it also comes close to the outer ring 2.

What is claimed is:

1. In a rolling bearing assembly including a plurality of rolling elements, the improvement consisting of a cage for the rolling elements, portions of said cage which do not contact the rolling elements being at least partially covered with a fibre flock.

2. A cage as claimed in claim 1 wherein the fibres are oriented generally perpendicular to the cage surface.

3. In a rolling bearing assembly comprising a pair of spaced ring members and a plurality of rolling elements in the annular space between the ring members, the improvement comprising a cage having pockets for circumferentially spacing the rolling elements and a circumferentially extended flange in close proximity to one of said ring members, portions of said cage which do not contact the rolling elements being at least partially covered with a fibre flock, the portion of said flange confronting the ring member being completely covered with a fibre flock to provide a seal there between.

4. A method of making a cage for assembly including a plurality of rolling elements consisting of the steps of covering the cage material with a fibre flock by an electrostatic and thereafter forming the pockets for the rolling elements in the cage material.

* * * * *